Figure 1:
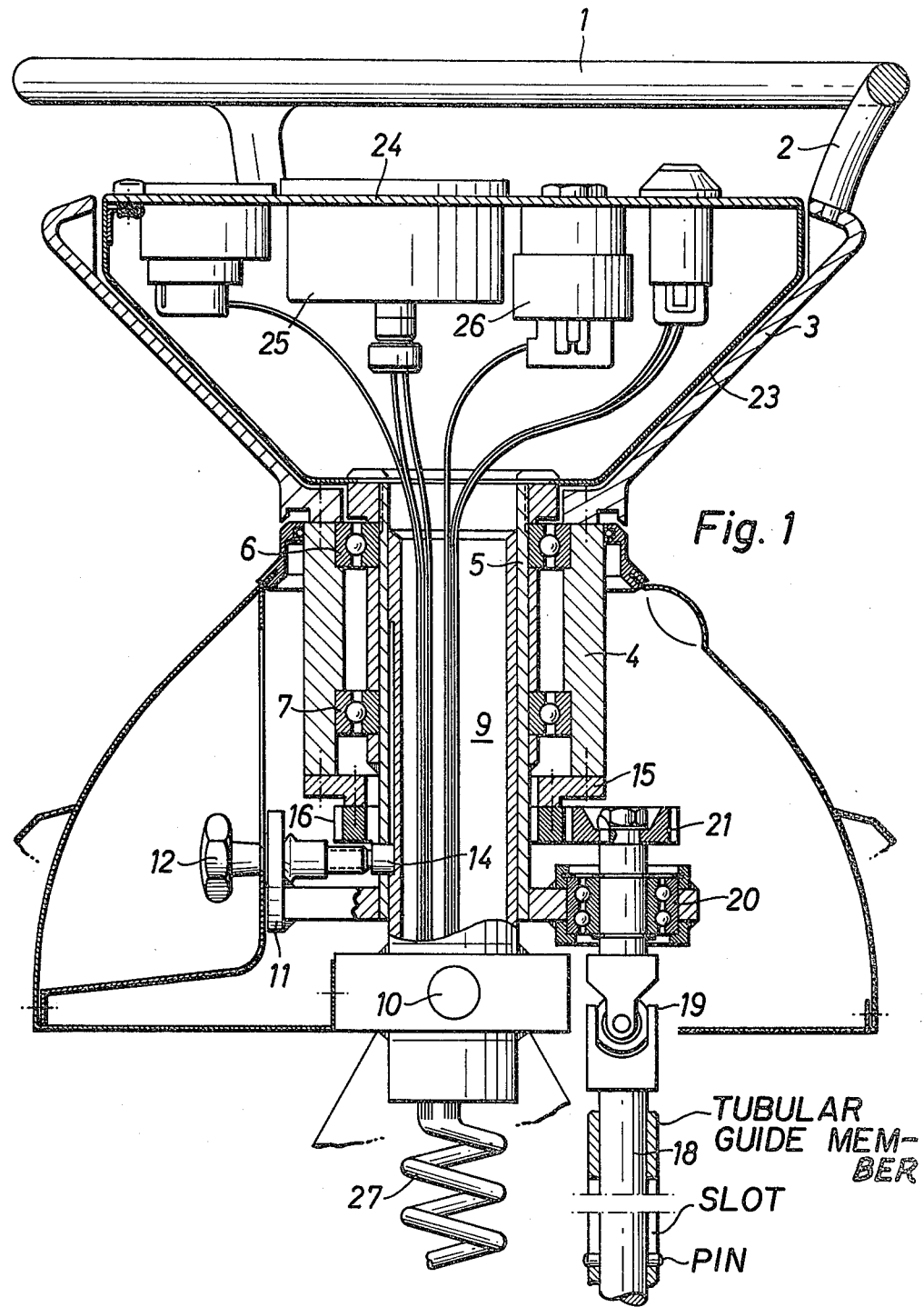

United States Patent [19]

Emundts et al.

[11] 4,429,588
[45] Feb. 7, 1984

[54] STEERING WHEEL FOR A MOTOR VEHICLE, PARTICULARLY FOR A TRACTOR

[75] Inventors: Horst Emundts, Bochum; Manfred Hoyer, Bergisch Gladbach; Walter Vogel, Cologne, all of Fed. Rep. of Germany

[73] Assignee: Klöckner-Humboldt-Deutz Aktiengesellschaft, Cologne, Fed. Rep. of Germany

[21] Appl. No.: 236,126

[22] Filed: Feb. 19, 1981

[30] Foreign Application Priority Data

Feb. 29, 1980 [DE] Fed. Rep. of Germany ....... 3007726

[51] Int. Cl.³ .......................... B62D 1/18; B62D 1/20
[52] U.S. Cl. .................................. 74/484 R; 74/493; 74/498; 280/775
[58] Field of Search .................. 74/484 R, 493, 498; 280/775

[56] References Cited

U.S. PATENT DOCUMENTS 3,543,874 12/1970 Nevett .................. 74/498

FOREIGN PATENT DOCUMENTS 54-20531 2/1979 Japan .................. 74/484 R

Primary Examiner—Allan D. Herrmann
Attorney, Agent, or Firm—Becker & Becker, Inc.

[57] ABSTRACT

A steering wheel for a motor vehicle, particularly for a tractor. The steering wheel has spokes which engage the steering wheel rim and are connected directly or indirectly with the steering shaft. A stationary plate is arranged in, and is axially and/or radially spaced from, the steering wheel rim. The plate preferably serves for receiving or mounting indicator instruments. A dish-shaped part with an acute flank angle is arranged between the steering wheel spokes and the steering shaft as a transfer member for the rotary movements serving for steering. The dish-shaped part tapers toward the steering shaft and is rotatably journalled on a stationary vehicle part and is rigidly connected with a gear which meshes directly or indirectly with a gear seated or located secure against rotation on the steering shaft. Furthermore, the dish-shaped part serves to receive a holder for the stationary plate as well as for the instruments arranged on its backside. The bottom of the dish-shaped part has secured thereto a cylindrical extension which rotatably surrounds either a sleeve which is secured against rotation, or a fixed support element.

4 Claims, 2 Drawing Figures

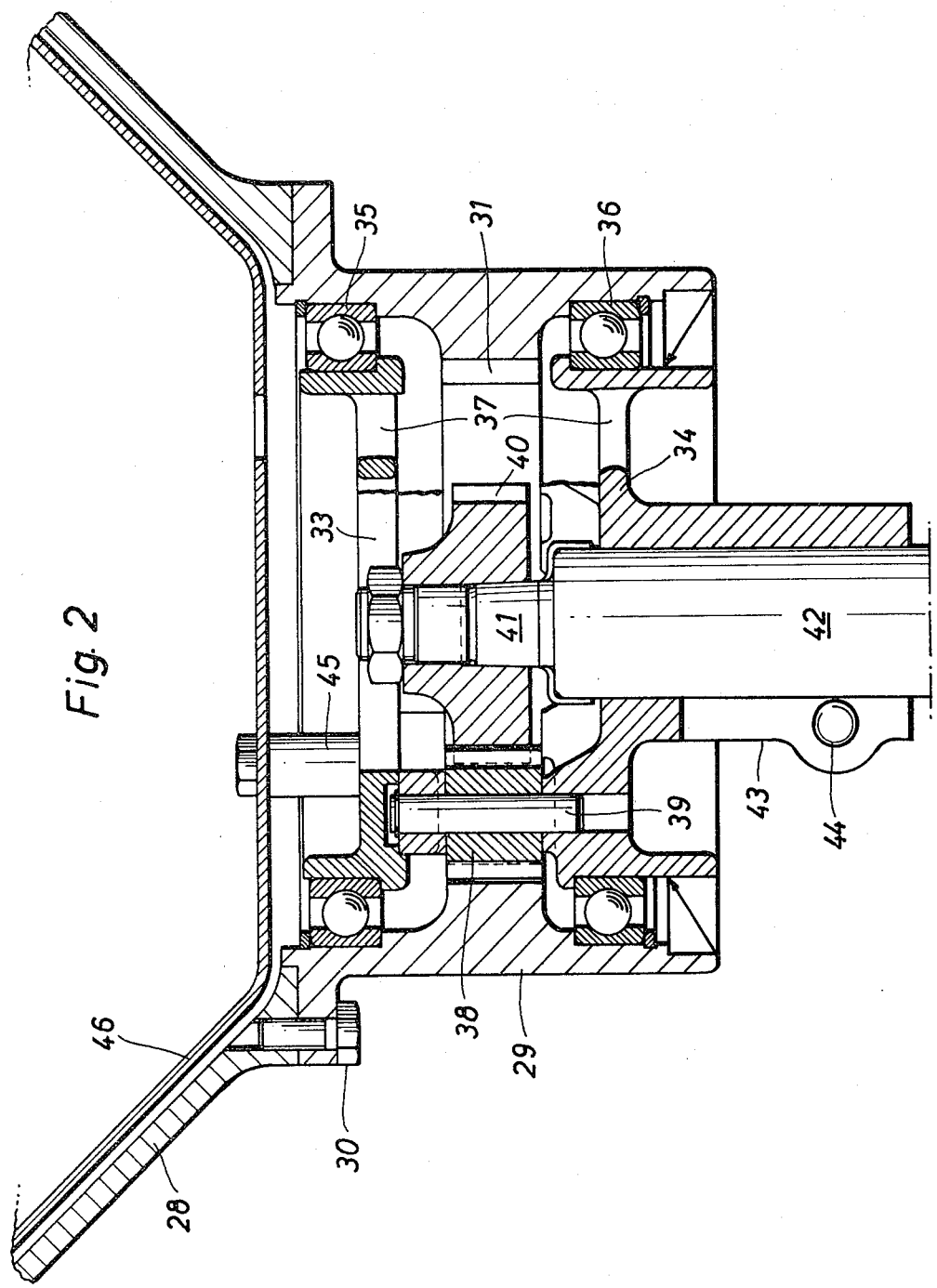

STEERING WHEEL FOR A MOTOR VEHICLE, PARTICULARLY FOR A TRACTOR

The present invention relates to a steering wheel for a motor vehicle, particularly for a tractor or prime mover. The steering wheel has spokes which engage the steering wheel rim and are directly or indirectly connected with the steering shaft. A stationary plate or the like is arranged in, and is axially and/or radially spaced from, the steering wheel rim. The plate preferably serves for receiving indicator instruments.

A steering device of the indicated type has already been proposed for utilization in passenger vehicles, according to which two steering wheel spokes are provided as connection elements between the steering wheel rim and the steering shaft. A circular stationary plate is centrally located with axial spacing in the steering wheel rim, and this plate forms the upper termination of a hollow space or chamber which is limited laterally and below. Electronic indicator instruments with several different scales are integrated in the stationary plate; these instruments indicate the traveling speed, the revolutions of the motor or engine driving the vehicle, etc. This known steering device is suitable for installation in a passenger vehicle, particularly since in this connection the steering wheel rim is arranged relatively steeply in contrast to such a rim for a tractor. An adjustment of the steering wheel by shifting thereof in the axial direction or by a pivoting in a vertical plane extending in the direction of travel is not provided for herewith.

It is an object of the present invention to provide a steering wheel of the initially described type which requires the most simple means and is particularly suitable for installation in tractors with relatively steeply arranged steering shafts without impairing the freedom of movement of the operator in the region of the steering column.

This object, and other objects and advantages of the present invention, will appear more clearly from the following specification in connection with the accompanying drawings, in which:

FIG. 1 is a longitudinal section through one embodiment of a steering device in accordance with the present invention; and FIG. 2 shows a further embodiment of a steering device of the present invention.

The steering wheel of the present invention is characterized primarily in that between the steering wheel spokes and the steering shaft, as a transfer or transmission member for the rotary movements serving for the steering, there is arranged a dish-shaped part which tapers toward the steering shaft and has an acute flank angle; this part is rotatably journalled on a stationary housing part and is rigidly connected with a gear which meshes directly or indirectly with a gear located secure against rotation on the steering shaft; furthermore, the dish-shaped part serves to receive a holding means or bracket for the stationary plate as well as for the instruments on its back side.

The shape of the dish-shaped part, as a transfer or transmission member for the rotary movements of the steering, is so adapted to the space required below the steering wheel by the operator in a seated position that the freedom of movement of the operator is not impaired by the installation of such a steering device. Furthermore, the indicator instruments which have to be monitored are always in the best visual range of the operator, even when the steering wheel is axially shifted or pivoted. In this connection, the actuating elements arranged on the stationary plate are also always well within the reach of the operator.

According to a further embodiment of the present invention, the bottom of the dish-shaped part may have secured thereto a cylindrical extension which surrounds and is rotatably journalled on a sleeve which is fixed against rotation. The sleeve serves as a mounting means for the stationary plate in the steering wheel rim, and the cylindrical extension supports the gear, which is embodied as a gear ring having outer toothing.

For the purpose of being able to adjust the steering wheel to a desired height position, as well as to an appropriate pivot angle, it is expedient to guide the rotationally secure sleeve in an axially shiftable and securable manner on a tubular body which in turn is pivotable below the two meshing gears in a vertical plane extending in the longitudinal direction of the vehicle, and is securably mounted on a structural element fixed to the vehicle; in this connection, the steering shaft, at the approximate level of the pivotable journalling of the tubular body, has a linkage which is movable in all directions, i.e., a universal joint.

According to a structurally advantageous embodiment of the present invention, an inner dish-shaped part is fastened to the top of the sleeve which is located on the tubular body so as to be axially shiftable and fixed against rotation thereon; the inner dish-shaped part conforms in shape to the dish-shaped part connected with the steering wheel spokes, and is installed therein so as not to contact it; the top of the inner dish-shaped part, as a termination, supports the rotationally secure plate which is arranged within the steering wheel rim.

With another advantageous embodiment of the present invention, a cylindrical extension is secured to the bottom of the dish-shaped part; this cylindrical extension rotatably surrounds a fixed or stationary support element, and supports a gear ring with inner toothing whereby at least one gear, which serves as a planetary gear, is journalled on the stationary support element; this gear meshes not only with the gear ring but also with a gear seated on the steering shaft, which in turn is centrally rotatably journalled in the support element. According to an expedient further embodiment of the present invention, the support element, which serves as a planetary gear support, has a lower part connected with the steering column, and an upper part which supports the stationary plate in the steering wheel; the planetary gears are arranged between these two spaced apart lower and upper parts; and furthermore, the support pins of the planetary gears are provided as connection members between the two parts.

Referring now to the drawings in detail, the steering device illustrated in FIG. 1 has a steering wheel rim 1 which is fastened by means of several relatively short steering wheel spokes 2 to a downwardly tapering dish-shaped part 3. On the downwardly open dish-shaped part 3, the side or flank of which is inclined at an acute angle to a radial plane passing through the lower end thereof, there is fastened a downwardly projecting cylindrical extension 4. The extension 4 surrounds a sleeve 5 which is secured against rotation and upon which the extension 4 is rotatably supported by means of two roller bearings 6 and 7. The sleeve 5 in turn is axially shiftably seated on a tubular body 9, which at its lower end is pivotable or securable by means of a stationarily mounted pivot pin 10 as well as by a clamping device which engages therewith (not illustrated). The axial mobility of the sleeve 5 can be determined with a set screw or clamping device 12 seated or located on a support 11, and in particular by a pressure or contact piece 14 which engages in the sleeve 5 and is supported on the tubular body 9. A gear ring 16 provided with an outer toothing is secured to the bottom of the cylindrical extension 4 by a ring or annular part 15. A steering shaft 18, which is guided to the steering device from below, has a universal joint 19 approximately at the level of the pivot pin 10, and is rotatably guided thereabove in a stationary roller bearing 20. At its upper end, the steering shaft 18 supports a gear 21 which meshes continuously with the gear ring 16.

To the upper end of the sleeve 5 there is secured an inner dish-shaped part 23 which conforms in shape to the outer dish-shaped part 3 and is installed free of engagement therein. The inner dish-shaped part 23 essentially corresponds in height to the height of the dish-shaped part 3, and supports at its top as a termination thereof a stationary plate 24. The plate 24 is removably mounted on the dish-shaped part 23 by means of screws, and serves preferably for receiving indicators 25, control elements 26, etc. The cables 27 for transmitting, for example, electrical signals, are guided out downwardly through the hollow tubular body 9, where they have a spiral shape so that they can make the changes in length which are necessitated by the pivoting of the steering wheel, and particularly by the axial adjustment thereof.

Naturally, the inventive steering device, aside from being used with the illustrated mechanical apparatus for transferring steering movements to the wheels being steered, can also for example be advantageously utilized with a steering having hydrostatic power transfer (power steering).

With the embodiment of a steering device according to FIG. 2, a dish-shaped part 28 is likewise connected with a steering wheel rim by non-illustrated steering wheel spokes. A cylindrical extension 29 is connected to the bottom of the downwardly open dish-shaped part 28, with screws 30 being provided as connection elements. The cylindrical extension 29 has a gear ring 31 provided with inner teeth, and surrounds a stationary support element 37 which has an upper part 33 as well as a lower part 34. The cylindrical extension 29 is rotatably journalled on the upper and lower parts 33 and 34 respectively of the support element 37 by way of roller bearings 35 and 36. In this connection, the two parts 33, 34 are radially spaced relative to each other in such a way that between both parts space is provided for three planetary gears 38 which mesh with the gear 31. The three planetary gears 38 are located or seated on support pins 39 which are simultaneously provided as connection members between the two parts 33 and 34. A sun gear 40, which meshes with the three planetary gears 38, is seated so as to be secure against rotation upon a steering shaft 41, which is rotatably journalled in a steering column 42, and is connected with the non-illustrated steering mechanism for operation of the steerable wheels of the vehicle. The part 34 of the support element 37 extends with an extension 43 over the steering column 42, and is mounted thereon by means of a clamping device 44.

The upper part 33 of the support element 37 has a plate-shape and on top supports an inner dish-shaped part 46 on the spacers 45. The inner dish-shaped part 46 is stationary just like the support element 37, and serves as a support for the non-illustrated stationary plate arranged within the steering wheel for receiving indicators and the like. The cables which are to be guided to the interior of the dish-shaped part 46 can be passed without any problem through non-illustrated openings in the dish-shaped part 46 as well as in the support element 37. Naturally, this steering device can be embodied also to be pivotable and/or telescopable for adaptation to the operator, and in place of the mechanical connection can be provided with a hydrostatic power transfer device (power steering).

With this embodiment, the steering device is equipped in such a way that it can be installed on the steering shaft like a steering wheel of conventional construction, and can be connected with the steering column. Consequently, for installing this steering device in a tractor or prime mover, no significant changes are necessary in that region of the operator platform which receives the steering device.

The present invention is, of course, in no way restricted to the specific disclosure of the specification and drawings, but also encompasses any modifications within the scope of the appended claims.

What we claim is:

1. A steering device for a motor vehicle, comprising in combination:
    a steering wheel rim;
    steering wheel spokes connected to said rim;
    a steering shaft;
    a dish-shaped part which is arranged between said spokes and said steering shaft to effect operative connection thereof, said dish-shaped part serving as a transfer member for the rotary movements which serve for the steering, said dish-shaped part having sides which extend at an acute angle to a radial plane passing through said part so that said dish-shaped part tapers toward said steering shaft;
    a support received within said dish-shaped part;
    a stationary plate connected to said support and arranged in, and spaced from, said rim for receiving indicator instruments;
    a fixed part on which said dish-shaped part is rotatably journalled;
    a first gear rigidly connected with said dish-shaped part; and
    a second gear fixedly connected to said steering shaft, said first gear meshing directly or indirectly with said second gear, said support for said stationary plate being an inner dish-shaped part which is mounted to that side of said sleeve facing said rim, said inner dish-shaped part conforming in shape to the shape of said first mentioned dish-shaped part and being installed therein so as not to contact therewith, that part of said inner dish-shaped part remote from said sleeve supporting said stationary plate as a termination of said inner dish-shaped part.

2. A steering device in combination according to claim 1, in which said fixed part includes a rotationally secure sleeve to which said support for said stationary plate is mounted, in which that portion of said dish-shaped part remote from said spokes is provided with a cylindrical extension which surrounds, and is rotatably journalled on, said sleeve, and in which said first gear is embodied as a gear ring having outer toothing, and is supported by said cylindrical extension.

3. A steering device for a motor vehicle, comprising:
    a steering wheel rim;

steering wheel spokes connected to said rim;
a steering shaft;
a dish-shaped part which is arranged between said spokes and said steering shaft to effect operative connection thereof, said dish-shaped part serving as a transfer member for the rotary movements which serve for the steering, said dish-shaped part having sides which extend at an acute angle to a radial plane passing through said part so that said dish-shaped part tapers toward said steering shaft;
a support received within said dish-shaped part;
a stationary plate connected to said support and arranged in, and spaced from, said rim for receiving indicator instruments;
a fixed part on which said dish-shaped part is rotatably journalled;
a first gear rigidly connected with said dish-shaped part;
a second gear fixedly connected to said steering shaft, said first gear meshing directly or indirectly with said second gear, said fixed part including a rotationally secure sleeve to which said support for said stationary plate is mounted, that portion of said dish-shaped part remote from said spokes being provided with a cylindrical extension which surrounds, and which is rotatably journalled on, said sleeve, and said first gear being embodied as a gear ring having outer toothing, and being supported by said cylindrical extension;
a structural element fixed to said vehicle; and
a tubular body which, on that side of said meshing first and second gears remote from said spokes, is pivotable in a vertical plane extending in the longitudinal direction of said vehicle, and is securably mounted to said structural element, said rotationally secure sleeve being guided on said tubular body in an axially shiftable and in a securable manner, and in which said steering shaft includes two parts which are connected to one another by a universal joint located approximately at the level of said pivotable mounting of said tubular body.

4. A steering device according to claim 3, in which said support for said stationary plate is an inner dish-shaped part which is mounted to that side of said sleeve facing said rim, said inner dish-shaped part conforming in shape to the shape of said first mentioned dish-shaped part and being installed therein so as not to contact therewith it, that part of said inner dish-shaped part remote from said sleeve supporting said stationary plate as a termination of said inner dish-shaped part.

* * * * *